United States Patent [19]

Regnier et al.

[11] Patent Number: 4,804,686

[45] Date of Patent: Feb. 14, 1989

[54] CATION-EXCHANGE SUPPORT MATERIALS AND METHOD

[75] Inventors: Frederick F. Regnier, West Lafayette, Ind.; William Kopaciewicz, Ipswich, Mass.

[73] Assignee: Purdue Research Foundation, West Lafayette, Ind.

[21] Appl. No.: 862,749

[22] Filed: May 13, 1986

[51] Int. Cl.[4] .............................................. C08D 5/20
[52] U.S. Cl. ....................................... 521/28; 521/31; 210/656
[58] Field of Search .................... 521/28, 31; 528/424; 210/656

[56] References Cited

U.S. PATENT DOCUMENTS

| | | | |
|---|---|---|---|
| 2,340,110 | 8/1943 | D'Alelio | 210/24 |
| 3,538,024 | 11/1970 | Dishburger | 520/424 |
| 3,786,113 | 1/1974 | Vassileff | 260/836 |
| 3,885,069 | 5/1975 | Roberts et al. | 427/396 |
| 3,892,709 | 7/1975 | Oda et al. | 260/39 R |
| 3,951,815 | 4/1976 | Wrasidlo | 528/424 |
| 4,245,005 | 1/1981 | Regnier et al. | 428/420 |
| 4,517,241 | 5/1985 | Alpert | 428/332 |
| 4,551,245 | 11/1985 | Ramsden et al. | 210/198.2 |
| 4,560,704 | 12/1985 | Regnier et al. | 521/31 |

FOREIGN PATENT DOCUMENTS 0143423 6/1985 European Pat. Off. .

OTHER PUBLICATIONS

Cation-Exchange High-Performance Liquid Chromatography of Proteins on Poly(Aspartic Acid)-Silica—Alpert—Journal of Chromatography, 266 (1983), 23-37.

Primary Examiner—Joseph L. Schofer
Assistant Examiner—Peter F. Kulkosky
Attorney, Agent, or Firm—Stacey L. Channing; William L. Baker

[57] ABSTRACT

Cation-exchange support materials and methods for producing such materials are disclosed. In making the support materials, first a thin layer of an adsorbate comprising amine groups is adsorbed to an inorganic support material such as silica, alumina or titania. The adsorbed coating is then optionally crosslinked by a crosslinking agent such as epoxy resin or alkyl bromide. At least one amine group of the adsorbed crosslinked coating is then reacted, preferably in the presence of a proton scavenger, with an amount of a hydrophilic reagent sufficient to generate at least one carboxyl group. Alternatively, amine groups of the uncrosslinked adsorbed coating are reacted, preferably in the presence of a proton scavenger, with an amount of a hydrophilic polyfunctional reagent sufficient to simultaneously crosslink said coating and generate carboxyl groups.

16 Claims, 3 Drawing Sheets

CATION-EXCHANGE SUPPORT MATERIALS AND METHOD

BACKGROUND OF THE INVENTION

This invention relates to cation-exchange materials and methods for forming the same and more particularly relates to cation-exchange support materials that are particularly well suited as packing materials for liquid chromatography.

High-performance anion and cation-exchange chromatography have become powerful tools for the analysis and isolation of biological molecules. Cation-exchange coatings for high performance liquid chromatography media have been synthesized by several routes. The simplest route is the silylation of a silica surface with an anionic organosilane. However, such reactions are reversible and can leave residual silanols which can irreversibly blind protein. Although this problem can be circumvented by bonding a hydrophilic organic polymer layer over the silica surface, this procedure does not give the required reproducibility. Another route for the synthesis of a cation-exchange coating is to start with an organosilane reaction to place a reactive function on a silica surface. The functionalized silica is then reacted with a preformed polymer providing a covalently bonded polymeric stationary phase. The last step further modifies the anchored polymer so that it is anionic. Although the cation-exchange coating produced is stable and of high binding capacity, this method for preparing cation-exchange coatings is quite lengthy.

Previous work by Alpert and Regnier with adsorbed polyethyleneimine chemistry as discussed in U.S. Pat. No. 4,245,005, the teachings of which are incorporated herein by reference, has shown it to be extremely versatile for the synthesis of anion-exchange stationary phases. Utilizing the existing adsorption technology pioneered by Alpert and Regnier for the synthesis of adsorbed polymeric anion-exchange media, cation-exchange materials of the invention have been produced.

European patent application No. 0 143 423 teaches cation-exchange matrials produced from polyethyleneimine; however, European patent application No. 0 143 423 provides a porous silica to which a non-crosslinked polyethyleneiminopropyl silane is covalently bonded, rather than adsorbed. In European patent application No. 0 143 423, particulate silica gel is reacted with polyethyleniminopropyl trimethoxy silane and the non-crosslinked covalently bonded polyethyleniminopropylsilyl-silica may be converted to a weakly acidic carboxylated form by conventional treatment, for example, with an appropriate dibasic acid anhydride in an inert organic solvent.

SUMMARY OF THE INVENTION

This invention provides cation-exchange materials and methods for producing such mateerials. The cation-exchange materials of the invention are well suited as packing materials for the separation of proteins and biological polymers in high performance liquid chromatography.

In making the cation-exchange materials, first a thin layer of an adsorbate comprising amine groups, preferably polyethyleneimine, is adsorbed to an inorganic support material such as silica, alumina or titania. The adsorbed coating is then optionally crosslinked by a crosslinking agent such as epoxy resin or alkyl bromide. At least one amine group of the adsorbed crosslinked coating is then reacted, preferably in the presence of a proton scavenger, with an amount of a reagent sufficient to generate at least one carboxyl group. Preferably many amine groups of the adsorbed crosslinked coating are reacted with an amount of reagent sufficient to generate carboxyl groups via the derivitization of amines. If the reagent used is polyfunctional, then the reagent preferably comprises a hydrophilic polymer, more preferably comprises a hydrophilic polymeric anhydride and most preferably comprises polyacrylic anhydride. If the reagent used is monofunctional, then the reagent preferably comprises a hydrophilic monomer, and more preferably comprises a hydrophilic monomeric anhydride.

Alternatively, amine groups of the uncrosslinked adsorbed coating are reacted, preferably in the presence of a proton scavenger, with an amount of a polyfunctional reagent sufficient to simultaneously crosslink said coating and generate at least one carboxyl group. The polyfunctional reagent preferably comprises a hydrophilic polymer, more preferably comprises hydrophilic polymeric anhydride and most preferably comprises polyacrylic anhydride.

Accordingly, it is a principal object of this invention to provide a cation-exchange material that is stable and reproducible.

It is a further object of this invention to provide such a cation exchange material that has a high loading capacity and excellent chromatographic characteristics.

It is yet another object of this invention to provide such a cation-exchange material that is simple and inexpensive to produce.

DETAILED DESCRIPTION OF THE INVENTION

Figure 1:
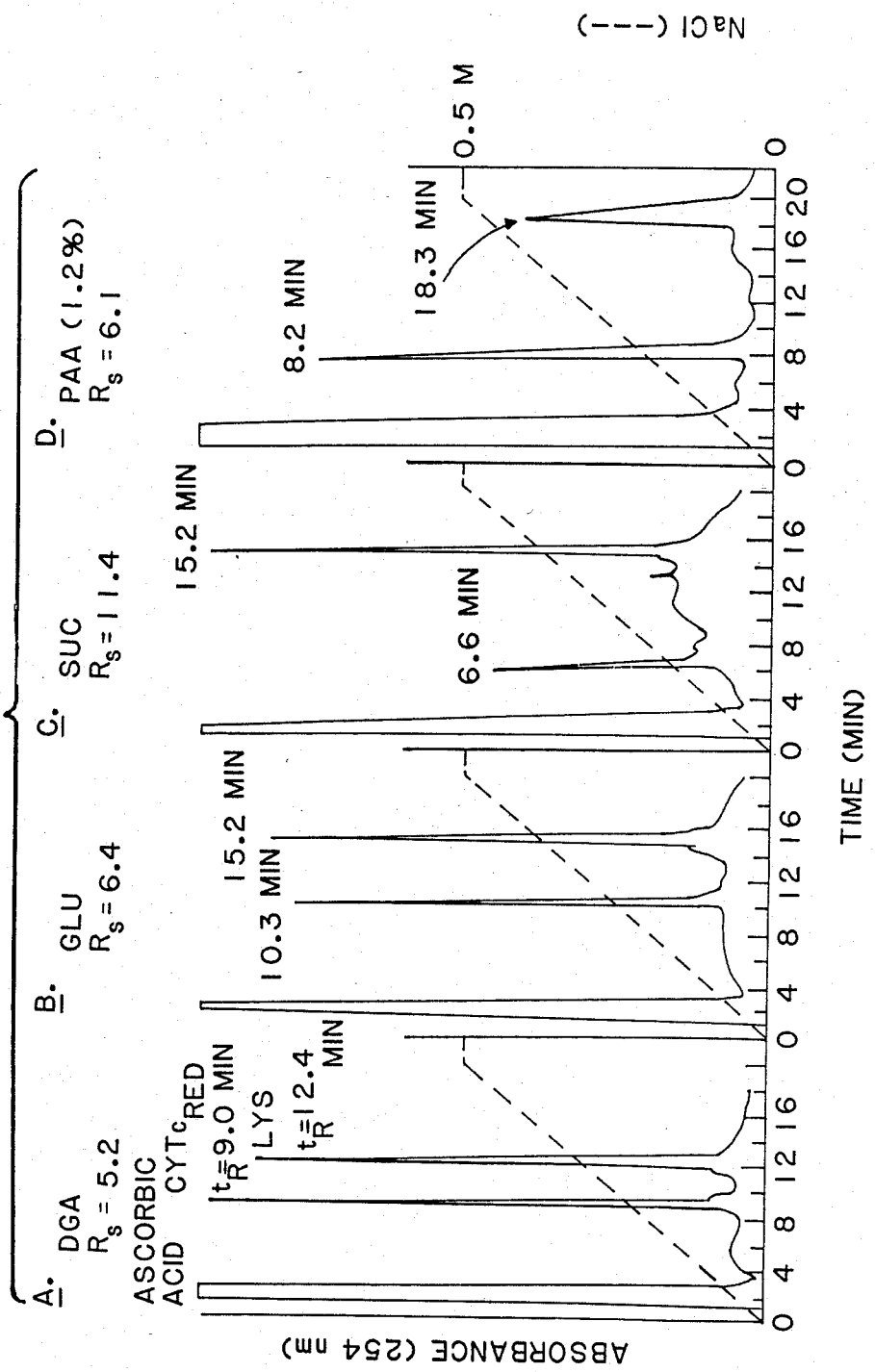
FIGS. 1A, B, C and D are graphs illustrating the chromatographic evaluation of four selected cationic-exchange columns based on the separation of a cytochrome c-lysozyme protein mixture.

This invention is particularly directed toward preparing cation-exchange materials that are particularly well suited as packing material for the separation of proteins and biological polymers in liquid chromatography.

In making the cation-exchange materials, as in U.S. Pat. No. 4,245,005, the surface of a support material having an affinity for an adsorbate is contacted with an adsorbate comprising amine groups such that a pellicular coating of said adsorbate is adsorbed to said surface by electrostatic foces. The adsorbate is preferably included in a solvent and adsorption can be partially established by controlling the polarity of said solvent. The less polar the solvent, the stronger the adsorption. A suitable solvent for this purpose is methanol. The adsorbate includes at least two functional groups, one of which interacts with the surface of the support material to cause adsorption thereof and the other of which is used for crosslinking. Although polyethyleneimine is the preferred adsorbate, other suitable adsorbates are 1,3-Diamino-2-hydroxypropane, tetraethylenepentamine, and ethylenediamine.

The support material is preferably an inorganic support material such as silica, alumina and titania with the preferred support material being silica. Specific examples of suitable inorganic support materials are LiChrospher Si 500 (10-micron particle diameter), LiChrosorb Si 100 (10-micron particle diameter), LiChrospher Si 100 (10-micron particle diameter) Chromosorb LC-6, Partisil 10, Vydac TPB, controlled pore glass (5-10 micron particle diameter; 100 Å pore diameter), Spherisorb alumina (10-micron particle diameter; 150 Å pore diameter), Bio-Rad basic alumina, Activity I (40-micron particle diameter), Bio-Rad acid alumina, Activity I (40-micron particle diameter), Corning titania (40/60 mesh; pore diameter=400 Å) Amicon Matrex® silica gels, zirconyl clad silica (a zirconium coating on Vydac TPB silica), and magnesium oxide.

After a pellicular coating of an adsorbate comprising amine groups is adsorbed to the surface of the support material, the adsorbed coating may be crosslinked by exposure of said surface to a crosslinker such as epoxy resin or alkyl bromide, the preferred crosslinker being a polyfunctional epoxy resin. Suitable epoxy resin crosslinkers include 1,2-ethanedioldiglycidylether, 1,4-butanedioldiglicydylether and 1,3-diglycidylglycerol. In order to produce a cation-exchange material, at least one amine group, and preferably many amine groups, of the crosslinked adsorbed coating are then reacted, preferably in the presence of a proton scavenger and preferably in a dry aprotic solvent such as dimethylformamide, with an amount of a reagent sufficient to generate at least one and preferably more than one carboxyl groups via the derivitization of surface amines. The proton scavenger preferably comprises a tertiary amine and more preferably comprises diisopropylethylamine. The reagent which reacts with the amine groups of the crosslinked adsorbed coating to produce carboxyl groups may be monofunctional or polyfunctional. If the reagent used is monofunctional, the the reagent preferably comprises a hydrophilic monomer, more preferably a hydrophilic monomeric anhydride and most preferably a hydrophilic monomeric cyclic anhydride. Examples of suitable monomeric anhydrides are glutaric anhydride, succinic anhydride, diglycolic anhydride and tetrahydrofuran 2,3,4,5-tetra-carboxylic dianhydride. If the reagent used is polyfunctional, then the reagent preferably comprises a hydrophilic polymer, more preferably a hydrophilic polymeric anhydride, and most preferably polyacrylic anhydride.

Alternatively, after a pellicular coating of an adsorbate comprising amine groups is adsorbed to the surface of the support material, amine groups of the uncrosslinked adsorbed coating are reacted, preferably in the presence of a proton scavenger, with an amount of a polyfunctional reagent sufficient to crosslink said coating and generate at least one and preferably more than one carboxyl groups via the derivitization of surface amines. Again, the proton scavenger preferably comprises a tertiary amine and more preferably comprises diisopropylethylamine. The polyfunctional reagent is preferably a hydrophilic polymer, is more preferably a hydrophilic polymeric anhydride and is most preferably polyacrylic anhydride. If the polyfunctional reagent employed is an anhydride, complete hydrolysis of any unreacted anhydrides is assured with dilute acid treatment.

The invention is further illustrated by the following non-limiting examples.

EXAMPLE 1

One gram of Vydac 101TPB 5.5 μm (spherical, 330 Å) silica was suspended in 10 ml of methanolic 1% w/v polyethyleneimine-18 (average molecular weight=1800) solution. The adsorbed coating was then crosslinked using 10 ml of a 5% v/v methanolic diglycidylglycerol solution. 0.7 grams of coated and crosslinked silica was placed in an oven at 110° C. for 30 minutes. The dry silica was then suspended in a solution consisting of 4 ml dry dimethylformamide, 250 μl (dry, redistilled) diisopropylethylamine (DIEA) and 200 mg of succinic anhydride (SUC). This acylation reaction generates carboxylic acids via the derivitization of surface amines. DIEA was added as a proton scavenger since an acid which could titrate adjacent amines (rendering them unreactive) is produced during the reaction of the anhydride and the amine coated and crosslinked silica. This reaction was repeated three times using different anhydrides-diglycolic anhydride (DGA), glutaric anhydride (GLU), and tetrahydrofuran-2,3,4,5 tetracarboxylic dianhydride (TETRA) in place of succinic anhydride. The reactions were allowed to proceed overnight at 60° C. Each product was then isolated on a sintered glass funnel and successively washed with methanol, water, triethylamine and methanol. After drying under a vacuum, these materials were stored in a desiccator. 50 mg of each of the resulting cation-exchange materials were assayed for their capacity to bind picric acid. Picric acid ion pairs with accessible (nonionized) amines but not with amides. Therefore, the amount of acylation can be determined as the percent loss of ion-pairable amines after derivitization.

A Perkin-Elmer Model 55 spectrophotometer was used to measure picric acid concentrations. The results of the picric acid assay are given in Table I.

TABLE I

Evaluation of Adsorbed Cation-Exchange Stationary Phases Synthesized from Monomeric Cyclic Anhydrides

| Anhydride Used | % SUB | $Hb_{cec}$ (mg/g) | $t_R$ (min) CYTc | $t_R$ (min) LYS | $R_s \frac{CYTc}{LYS}$ |
|---|---|---|---|---|---|
| Succinic | 80 | 42 | 6.6 | 15.2 | 11.4 |
| glutaric | 69 | 39 | 10.3 | 15.2 | 6.4 |
| diglycolic | 86 | 51 | 9.0 | 12.4 | 5.2 |
| tetrahydrofuran 2,3,4,5-tetracarboxylic dianhydride | 74 | 41 | 11.6 | 21.0 | 4.5 |

The term % SUB is the percent substitution determined from picric acid ion-pairing capacity assays both before and after derivitization:

$$\%SUB = \frac{[\mu\text{mole amine/g before} - \mu\text{mole amine/g after}]}{\mu\text{mole amine/g before}} \times 100$$

In general, about seventy percent of the surface amines could be acylated (Table 1). Slight deviations from this number (depending on the anhydride) resulted from either inaccuracies in measurement (±5%) or variations in reactivity. Since picric acid adsorbed to all the above coatings, there were amines interspersed with carboxyl moieties. However, these cation exchange materials did not bind hemoglobin at pH 8, (at which pH hemoglobin is negatively charged), indicating that these amines are not accessible to large molecules such as protein, but are only accessible to small molecules such as picric acid.

50 mg of each of the cation-exchange materials were next assayed for their capacity to bind macromolecules (hemoglobin bovine crude type II at pH 5.5 so that the protein was positively charged.) A Perkin-Elmer Model 55 spectrophotometer was used to measure hemoglobin concentrations. The cation-exchange materials synthesized with glutaric anhydride, succinic anhydride, and tetrahydrofuran-2,3,4,5-tetracarboxylic dianhydride all bound about 40 mg hemoglobin per gram of coated support material. The diglycolic anhydride cation-exchange material bound slightly more hemoglobin, possibly due to increased derivitization (Table I). The ability of these materials to bind hemoglobin at pH 5.5 was used to demonstrate protein cation-exchange binding capacity ($Hb_{cec}$).

Next, approximately 0.5 g each of the succinic anhydride (SUC), glutaric anhydride (GLU), diglycolic anhydride (DGA), and tetrahydrofuran-2,3,4,5-tetracarboxylic dianhydride (TETRA) cation-exchange materials were packed into individual 0.41×5 cm ID columns for chromatographic evaluation (See Table 1 and FIGS. 1A, B, C). Chromatography was performed (with an LDC Constametric I and IIIG system with Gradient Master-Laboratory Data Control, Riviera Beach, Fla.) using as an eluent a 20 minute linear gradient from 0.01M NaOAc (pH 5.5) to 0.5M NaCl in 0.01M NaOAc (pH 5.5) at a 1 ml/min flow rate. The analytical test sample (20 μl) consisted of 3 mg/ml cytochrome c (CYTc-horse heart, pI=9.2) and 5 mg/ml lysozyme (LYZ-egg white, pI=11) along with a trace of ascorbic acid to inhibit oxidation. Detection was $A_{254}$ monitored by a model 153 Altex UV detector (Anspec, Ann Arbor, Mich.). The retention times ($^tR$) of the CYTc and LYZ peaks are given in Table I and shown graphically in FIG. 1. Resolution ($R_s$ in Table 1 and FIG. 1) between CYTc and LYZ was calculated according to the equation:

$$R_s = 2(^tR_2 - {^tR_1})/(\Delta^tR_1 + \Delta^tR_2)$$

The symbols $^tR_1$ and $^tR_2$ are the retention times of each peak while $\Delta^tR_1$ and $\Delta^tR_2$ are the peak widths. The subscripts 1 and 2 refer to the first and second peak to elute from the column. The highest $R_s$ value was obtained on the SUC column. This resulted from unique selectivity rather than reduced peak width. Although lysozyme was strongly retained, CYTc eluted early (FIG. 1C). Performance of the succinic anhydride material was also noteworthy for economic reasons, i.e. it is the least expensive of the anhydrides.

EXAMPLE II

Polyacrylic anhydride (PAA) was synthesized by weighing five grams of polyacrylic acid (2000 M.W., chain length of 28) into a 100 ml round bottom flask and then placing it in an oil bath at 180° C. The flask was then connected to a vacuum pump and evacuated for three hours. The resulting yellow solid was chipped from the flask and stored in a dessicator. Analysis by NMR showed 79% of the carboxyls to be dehydrated corresponding to approximately 11 anhydride functions per polymer molecule.

0.7 grams of Vydac 101 TPB 5.5 μm (spherical, 330 Å) silica was suspended in 10 ml of a 1% w/v methanolic polyethyleneimine-18 solution and allowed to stand at room temperature for 30 minutes. The adsorbed silica was reisolated on a sintered glass funnel and placed in an oven at 110° C. for 30 minutes. The dry media was then transferred to a 50 ml round bottom flask containing 4 ml dry dimethylformamide, 250 μl dry redistilled diisopropylethylamine and 50 mg of the above prepared polyacrylic anhydride (1.2% PAA). This reaction was repeated two more times using different amounts of polyacrylic anhydride-100 mg polyacrylic anhydride (2.4% PAA) and 200 mg of polyacrylic anhydride (4.7% PAA). The reactions were allowed to proceed overnight at 60° C. Each product was then isolated on a sintered glass funnel and successively washed with methanol, water, triethylamine and methanol. After drying under a vacuum, these materials were stored in a dessicator. 50 mg of each of the resulting cation-exchange materials synthesized with varying concentrations of polyacrylic anhydride were assayed for their capacity to bind picric acid. The results of the assay are given in Table II.

TABLE II

Evaluation of Adsorbed Cation-Exchange Stationary Phases Synthesized from Polyacrylic Anhydride

| PAA (w/v %) | % SUB | $Hb_{cec}$ (mg/g) | $t_R$ (min) CYTc | $t_R$ (min) LYS | $R_s \frac{CYTc}{LYS}$ |
|---|---|---|---|---|---|
| 4.7 | 59 | 59 | 10.6 | NE | ∞ |
| 2.4 | 68 | 54 | 8.8 | 15.4 | 6.6 |
| 1.2 | 55 | 36 | 6.6 | 10.6 | 4.9 |

Interestingly, the percent acylation of these cation-exchange materials was less than that obtained with the monomeric anhydrides in Example I. Access of the large polyacrylic anhydride to stationary phase amines may be hindered for steric reasons. Since there was no anion-exchange hemoglobin binding, the cation-exchange materials were assumed to be adequately crosslinked with no accessible residual positive charge.

50 mg of each of the polyacrylic anhydride cation-exchange materials were next assayed for their protein cation-exchange binding capacity ($Hb_{cec}$) using hemoglobin (bovine crude type II) at a buffer pH of 5.5. The results of this assay are given in Table II. Hemoglobin binding increased with polyacrylic anhydride concentration. The largest value was obtained on the material synthesized with the highest concentration (4.7% PAA). Both this material and the material prepared with 2.4% PAA bound more hemoglobin than the diglycolic anhydride cation-exchange material produced in Example I. Since all the cation-exchange materials of Example I and Example II started with a common intermediate (i.e. uncrosslinked polyethyleneimine adsorbed to Vydac silica), increased hemoglobin binding capacity appears to be directly related to the ratio of amide to carboxyl groups of the covalently bonded PAA.

Polyacrylic anhydride is a linear polymer. Unlike the monomeric anhydrides of Example I where the carboxyl group must be within five atoms of the surface, lengths of polyacrylic acid (stems and loops) can reach out into the silica pore volume. The existence of such structures would give the surface a serrated topography, effectively increasing surface area. Since binding capacity is directly related to the latter, an increase results. The cation-exchange material crosslinked with 1.2% PAA bound 36 mg hemoglobin per gram of coated support which was comparable to the monomeric anhydride cation-exchange material of Example I. At lower concentrations of polyacrylic anhydride, stem and loop structures may not predominante, since there is less competition for surface amines and the polyacrylic anhydride molecules react extensively.

Approximately 0.5 g of each of the polyacrylic anhydride cation-exchange materials were packed into 0.41×5 cm columns for chromatographic evaluation. Chromatography was performed with the chromatography instrumentation and detection apparatus of Example I using a 20 minute linear gradient from 0.01M NaOac (pH 5.5) to 1M NaCl in 0.01M NaOac (pH 5.5) at a 1 ml/min flow rate as an eluent. The analytical test sample (20 $\mu$l) consisted of CYTc and LYZ together with a trace of ascorbic acid as in Example I. The retention times ($^t$R) of the CYTc and LYZ peaks and the resolution (calculated as in Example I) between CYTc and LYZ are given in Table II and the retention times of the CYTc and LYZ peaks on 1.2% PAA material are shown graphically in FIG. 1. The retention times of CYTc and lysozyme increased with PAA concentration. In fact, lysozyme could not be eluted from the 4.7% PAA column with 1M NaCl, and 0.77M NaCl was required for desorption from the 2.4% PAA column. These values are substantially higher than those obtained from the columns of Example I. Although the strongly retentive 4.7% column may not be chromatographically practical because it is too retentive, it might be of use for protein immobilization. Cationic polypeptides, such as antibodies, could be tightly adsorbed to the matrix for immunoaffinity chromatography. Using a 20 minute linear gradient from 0 to 1M NaCl, the resolution between CYTc and LYZ varied from "infinite" on the 4.7% PAA column to a value of 4.9 on the 1.2% PAA column. The 4.7% PAA column gave an undefined $R_s$, due to the infinite retention of LYZ. The 1.2% PAA column provided the lowest $R_s$ value under the specified conditions; however, this value increased to 6.1 when the gradient slope was decreased by one-half (see FIG. 1D).

EXAMPLE III

Figure 2:
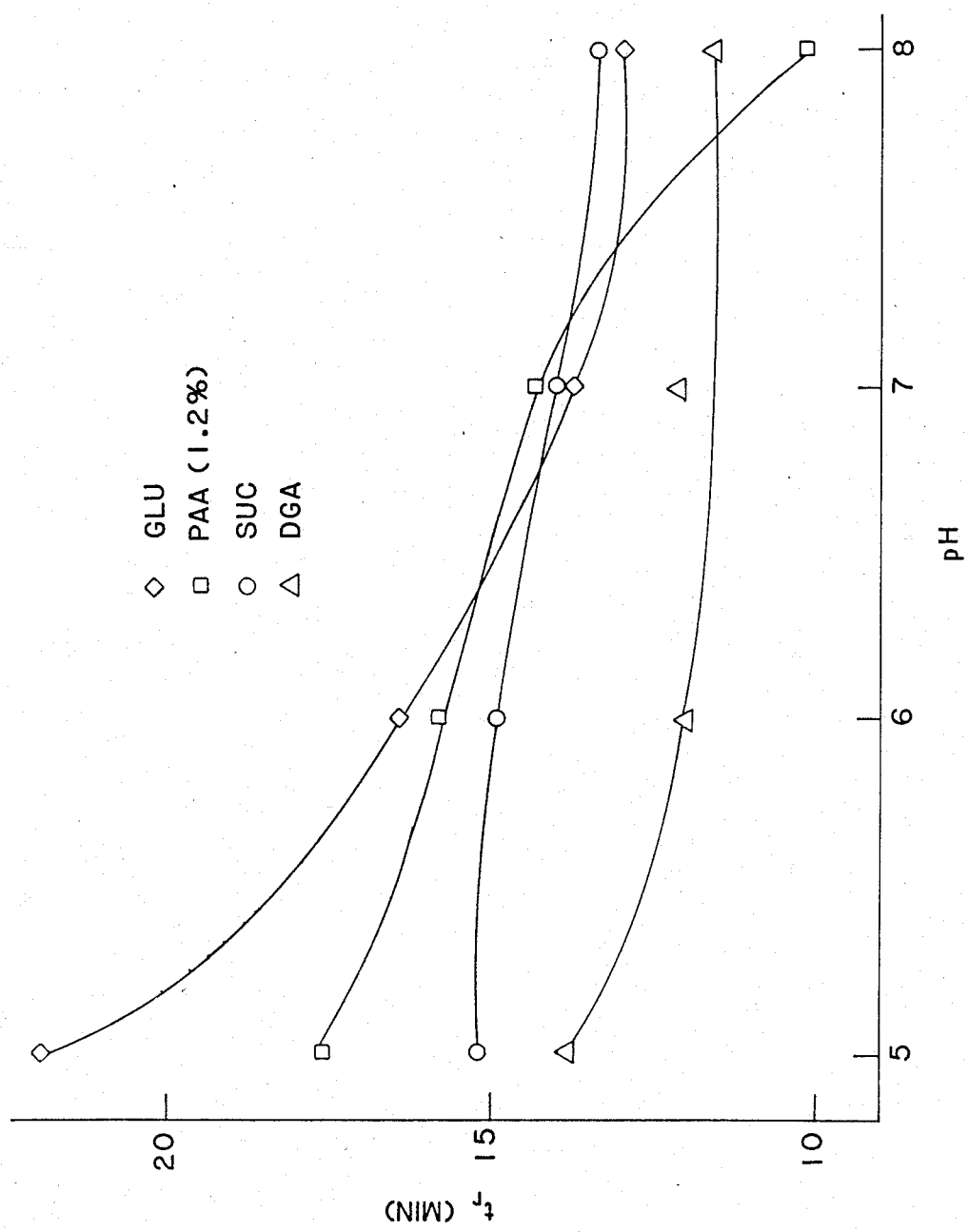
FIG. 2 is a graph illustrating the retention of lysozyme as a function of pH on four selected cation-exchange columns.

Approximately 20 $\mu$l of test sample similar to that in Example I of CYTc and LYZ together with a trace of ascorbic acid was chromatographed on the glutaric anhydride, succinic anhydride and diglycolic anhydride columns of Example I and the 1.2% polyacrylic anhydride column of Example II at several eluent pH values (other conditions constant). In all cases, retention was inversely related to pH (FIG. 2 shows the retention of just lysozyme). This behavior results from an increase in the protein net positive charge as eluent pH drops below the isoelectric point. Closer examination shows the glutaric anhydride column to be the most pH sensitive. Since glutaric anhydride contains an additional methylene group, a cooperative hydrophobic-ionic interaction may be responsible. This experiment served to define the general pH operating range of these cation-exchange materials. A resolution of 4 or more between CYTc and LYZ was obtained from pH 5.5 to 7.5.

EXAMPLE IV

The succinic anhydride column of Example I and the 1.2% polyacrylic anhydride column of Example II were chosen as representative media for the fractionation of a crude protein mixture. The sample consisted of an extract from the cyanobacteria *Aphanizomenon flos-aquae* which contained cytochrome $c_{553}$ (CYTc$_{553}$). This protein has an isoelectric point of 9.3, a molecular weight of 11,000 and unique spectral properties. In the reduced state, the visible absorption spectrum exhibits maxima at 280, 410 and 553 nanometers.

The crude cell extract was partially processed by ultrafiltration (30,000 MW cutoff membrane). The resulting filtrate, which contained less than 0.5 mg/ml protein, was collected and adjusted to pH 7. An 80 $\mu$l aliquot of this mixture was then loaded on each (0.41×5 cm) cation-exchange column. As in Example I, chromatography was performed using a 20 minute linear gradient from 0.01M NaOac (pH 7) to 0.5M NaCl in 0.01M NaOac (pH 7) at a 1 ml/min flow rate as an eluent. Dual wavelength monitoring (at 260 and 410 nm) was performed with an HP 1040 A Detection system (Hewlett Packard, Corvallis, Oreg.). The 260 nm signal detects all proteins, while the 410 nm signal monitors those which contain polyporphorin rings (e.g. CYTc$_{553}$)

Figure 3:
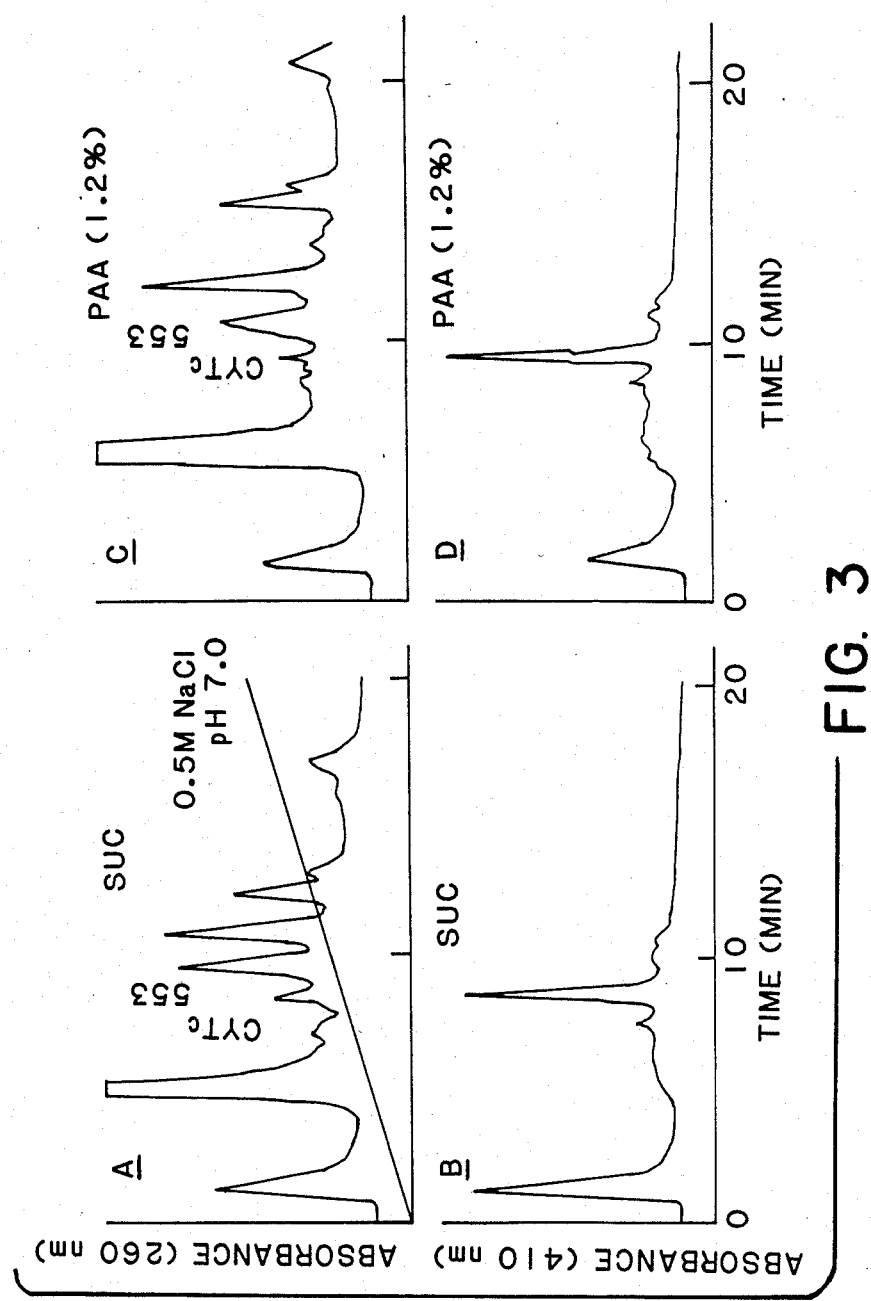
FIGS. 3(A, B,) and (C, D) are graphs illustrating the chromatographic evaluation of two selected cationic exchange columns of an A. Flos-aquae (algae) extract containing cytochrome $c_{553}$.

Examination of the chromatogram obtained from the succinic anhydride column (at 260 nm) shows a substantial number of ultraviolet adsorbing materials (FIG. 3A). However, the small peak eluting at 8.5 minutes was identified as CYTc$_{553}$ (FIG. 3B) based on its spectral properties. The 553/280 adsorbance ratio at the peak apex was 0.4. Since a value of 1 is considered 90% pure, impurities are still present. Nevertheless, judging from the peak area of CYTc$_{553}$ relative to the remaining peak areas, substantial purification was achieved. Chromatography on the 1.2% polyacrylic anhydride column under identical conditions gave similar results (FIG. 3C). In general, this support was slightly more retentive than the succinic anhydride column and also slightly more selective, separating the mixture into 12 distinct peaks as compared to 10. Again CTYc$_{553}$ was identified by its visible absorbance at a retention time of 9.4 minutes. Spectral analysis at the peak apex gave a 553/280 absorbance ratio of approximately 0.45.

While this invention has been described with reference to its preferred embodiment, other embodiments can achieve the same result. Variations and modifications of the present invention will be obvious to those skilled in the art and it is intended to cover in the appended claims all such modifications and equivalents as fall within the spirit and scope of this invention.

We claim:

1. A process for producing a cation-exchange material comprising the steps of:
    (a) providing a support material having a surface with an affinity for an adsorbate;
    (b) contacting the surface of said support material with an adsorbate comprising amine groups such that a pellicular coating of said adsorbate is adsorbed to said surface by electrostatic forces; and;
    (c) producing a cation-exchange material by reacting amine groups of the adsorbed coating with an amount of a polyacrylic polyanhydride sufficient to crosslink said coating and generate at least one carboxyl group.

2. The process of claim 1 wherein a proton scavenger comprising a tertiary amine is added to the reaction of amine and polyacrylic polyanhydride in step c.

3. The process of claim 2 wherein the proton scavenger comprises diisopropylethylamine.

4. The process of claim 1 wherein said support material is an inorganic support material selected from the group consisting of silica, alumina and titania.

5. The process of claim 1 wherein said adsorbate is selected from the group consisting of polyethyleneimine, 1,3-Diamino-2-hydroxypropane, tetraethylenepentamine, and ethylenediamine.

6. The process of claim 1 wherein said adsorbate is included in a solvent and wherein adsorption is at least partially established by controlling the polarity of said solvent.

7. The process of claim 6 wherein the solvent comprises methanol.

8. A process for producing a cation-exchange material comprising the steps of:
 (a) providing a silica support material having a surface with an affinity for an adsorbate;
 (b) contacting the surface of said support material with an adsorbate comprising polyethyleneimine such that a pellicular coating of said adsobate is adsorbed to said surface by electrostatic forces; and
 (c) producing a cation-exchange material by reacting said adsorbed polyethyleneimine coating in the presence of a proton scavenger with an amount of polyacrylic polyanhydride sufficient to crosslink said coating and generate carboxyl groups.

9. A cation-exchanger material prepared by a process comprising the steps of:
 (a) providing a support material having a surface with an affinity for an adsorbate;
 (b) contacting the surface of said support material with an adsorbate comprising amine groups such that a pellicular coating of said adsorbate is adsorbed to said surface by electrostatic forces; and
 (c) reacting amine groups of the adsorbed coating with an amount of polyacrylic polyanhydride sufficient to crosslink said coating and generate at least one carboxyl group.

10. The cation-exchange material of claim 9 wherein a proton scavenger comprising a tertiary amine is added to the reaction of amine and polyacrylic polyanhydride in step c.

11. The cation-exchange material of claim 9 wherein said support material is an inorganic support material selected from the group consisting of silica, alumina and titania.

12. The cation-exchange material of claim 9 wherein said adsorbate is selected from the group consisting of polyethyleneimine, 1,3-Diamino-2-hydroxypropane, tetraethylenepentamine, and ethylenediamine.

13. The cation exchange material of claim 9 wherein said adsorbate is included in a solvent and wherein adsorption is at least partially established by controlling the polarity of said solvent.

14. The process of claim 1 wherein in step c, many carboxyl groups are generated.

15. The process of claim 1 further comprising the steps of:
 (d) packing the cation-exchange material into a chromagraphic column; and
 (e) chromatographing a test sample on said column using an appropriate eluent.

16. The process of claim 15 wherein the test sample comprises a mixture of proteins or other biological polymers.

* * * * *